`United States Patent` [19]

Saito et al.

[11] Patent Number: 4,770,489

[45] Date of Patent: Sep. 13, 1988

[54] RUGGEDIZED OPTICAL COMMUNICATION CABLE

[75] Inventors: Yasunori Saito; Kenji Morita, both of Cary; John DeAngeles, Durham; Shyi-Hwang Shyu, Cary, all of N.C.

[73] Assignee: Sumitomo Electric Research Triangle, Inc., Research Triangle Park, N.C.

[21] Appl. No.: 900,787

[22] Filed: Aug. 27, 1986

[51] Int. Cl.⁴ .............................................. G02B 6/44
[52] U.S. Cl. ..................................................... 350/96.23
[58] Field of Search ........................................ 350/9.23

[56] References Cited

U.S. PATENT DOCUMENTS

| | | | |
|---|---|---|---|
| 4,231,635 | 11/1980 | Zeidler et al. | 350/96.23 |
| 4,239,335 | 12/1980 | Stiles | 350/96.23 |
| 4,318,588 | 3/1982 | Zeidler et al. | 350/96.23 |
| 4,365,865 | 12/1982 | Stiles | 350/96.23 |
| 4,389,087 | 6/1983 | Bendayan et al. | 350/96.23 |
| 4,491,386 | 1/1985 | Negishi et al. | 350/96.23 |
| 4,505,541 | 3/1985 | Considine et al. | 350/96.23 |
| 4,534,618 | 8/1985 | Brüggendieck | 350/96.23 |
| 4,550,976 | 11/1985 | Cooper et al. | 350/96.23 |
| 4,693,551 | 9/1987 | Blanco et al. | 350/96.23 |
| 4,715,677 | 12/1987 | Saito et al. | 350/96.23 |

FOREIGN PATENT DOCUMENTS

| | | |
|---|---|---|
| 0136913 | 4/1985 | European Pat. Off. . |
| 54-128353 | 10/1979 | Japan . |
| 58-7105 | 1/1983 | Japan . |
| 58-11906 | 1/1983 | Japan . |
| 58-93007 | 6/1983 | Japan . |
| 58-129401 | 8/1983 | Japan . |
| 58-132102 | 8/1983 | Japan . |
| 58-150913 | 9/1983 | Japan . |
| 58-205110 | 11/1983 | Japan . |

Primary Examiner—John D. Lee
Assistant Examiner—Phan Heartney
Attorney, Agent, or Firm—Richard E. Jenkins

[57] ABSTRACT

There is provided an optical fiber communication cable as described including at least one rigid tension element provided in combination with conventional single tube loose buffer cable and grooved spacer core cable constructions in order to provide greater tensile strength and an enhanced operating temperature range.

29 Claims, 3 Drawing Sheets

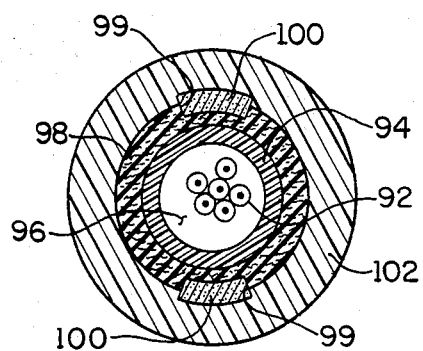
FIG. 5
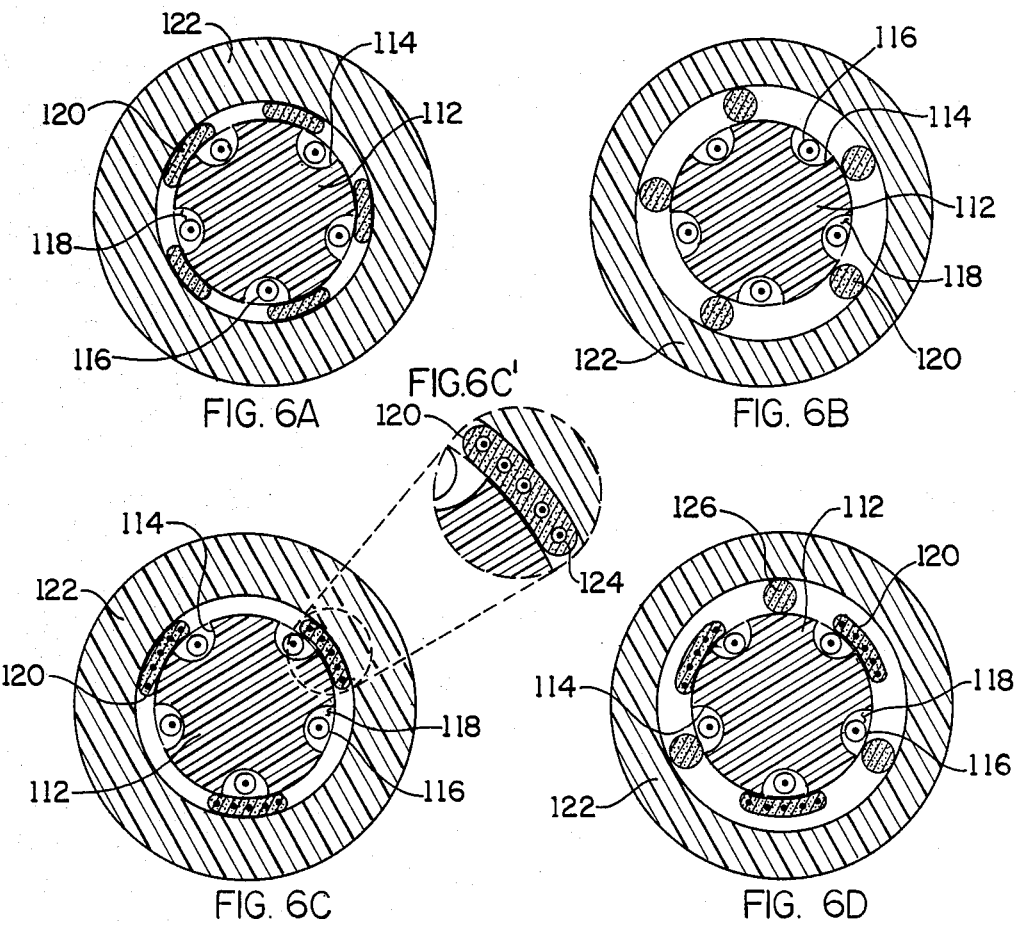
FIG. 6A  FIG. 6B
FIG. 6C'
FIG. 6C  FIG. 6D

RUGGEDIZED OPTICAL COMMUNICATION CABLE

DESCRIPTION

TECHNICAL FIELD

The invention relates generally to optical communication cables, and more particularly to improved loose buffer tube and grooved spacer core cable constructions therein one or more rigid tension elements are provided in order to enhance tensile strength and increase the operating temperature range of the cable.

BACKGROUND ART

Single tube loose buffer cables have been used to date in only limited applications, not including aerial and buried applications, because of their inherent low mechanical strength and poor temperature performance. The present invention allows these cables to be used in most duct, aerial and buried applications. Grooved spacer core cables have been used previously in duct applications as well as aerial and buried applications. However, the lack of suitable rigid tension elements in both of these constructions has limited the operating temperature range, the tensile strength and other mechanical properties of both of these cables.

Representative prior art would include U.S. Pat. No. 4,491,386 to Negishi et al. which discloses a grooved spacer core optical fiber cable and a process for producing the cable. The patent discloses providing an armor coating around the outer sheath of the cable for mechanical reinforcement. U.S. Pat. No. 4,239,335 to Stiles discloses providing at least one fiber with an elastomeric coating and then applying a fiber reinforced resin shell thereover. U.S. Pat. No. 4,534,618 to Bruggendieck and U.S. Pat. No. 4,318,588 to Zeidler et al. disclose optical communication cables utilizing glass fiber or spun yarns in a reinforced casing. Other patents of possible interest include U.S. Pat. No. 4,389,087 to Bendayan et al. and U.S. Pat. No. 4,365,865 to Stiles.

Although reinforced optical communication cables are presently known, applicant believes that the particular ruggedized loose buffer tube and grooved spacer core communication cable construction disclosed herein are unique and novel in the optical fiber communication cable technology.

DISCLOSURE OF THE INVENTION

According to the present invention, there is provided ruggedized optical communication cable of the loose buffer tube and grooved spacer core type which possess enhanced tensile strength and an improved operating temperature range so as to provide for application to end uses which have not heretofore been possible.

The invention provides at least one rigid tension member of fiber reinforced plastic or other suitable material having a high Young's Modulus and a low thermal expansion coefficient which is incorporated into a loose buffer tube cable in the form of an outer casing or as one or more longitudinally extending strands encased within the cable. A variation of the ruggedized optical communication cable of the invention contemplates incorporating one or more rigid tension members of fiber reinforced plastic or other suitable material having a high Young's Modulus and low thermal expansion coefficient into a grooved spacer core type cable along the length of the spacer core and surrounded by an outer jacket. Moreover, this particular embodiment further contemplates the possibility of providing one or more longitudinally extending optical fibers within the rigid tension members for enhanced performance capabilities which will be discussed in more detail hereinafter.

By incorporating rigid tension elements into loose buffer tube cables and grooved spacer core cables according to the teachings of the present invention the tensile strength and overall mechanical performance are improved and a greater operating temperature range is achieved.

Therefore, one object of the present invention is to provide an optical communication cable that is free from certain performance shortcomings of previously proposed cables of similar construction.

More specifically, it is an object of the present invention to provide an improved loose buffer tube cable possessing greater tensile strength and enhanced operating temperature range.

Still a further object of the present invention is to provide an improved grooved spacer core communication cable possessing greater tensile strength and enhanced opeating temperature range.

Still another object of the present invention is to provide an improved ruggedized optical communication cable of the single tube loose buffer design with expanded applications.

BRIEF DESCRIPTION OF THE DRAWINGS

The present invention will now be described in detail with reference to the accompanying drawings in which:

FIG. 5 is a cross-section view of a fourth embodiment of the present invention; and FIGS. 6A-6C, 6C' and 6D are cross-section views of a fifth embodiment of the present invention.

BEST MODE FOR CARRYING OUT THE INVENTION

In accordance with the present invention, there is provided a unique ruggedized optical communication cable construction for enhanced tensile strength and increased operating temperature range in order to provide for applications of single tube loose buffer cables not heretofore possible and for improved grooved spacer core cables having enhanced performance characteristics.

As used in the specification and claims, the term "optical fiber" means an optical guide utilized for light transmission which may be either multimode or monomode and which may utilize any core to cladding ratio or numerical aperture. The optical fiber may contain a primary coating of a plastic such as silicone, acylic resin or the like, over the cladding. An additional coating of plastic such as nylon, polyester or the like may also be provided over the primary coating of the optical fiber. The term "loose buffer tube" used herein means a loosely fitting plastic tube containing a plurality of coated optical fibers therein and filled with a soft jelly-like material. The term "grooved spacer core" used herein means a grooved central core having a number of grooves in the surface thereof which are each filled with a soft, jelly-like material and one or more coated optical fibers. A plastic jacket is provided around the grooved core and, most suitably, a layer of fibrous material provided between the grooved core and the plastic jacket.

Preferred embodiments of the present invention are described hereunder by reference to the accompanying drawings, FIGS. 1 to 6.

Figure 1A:
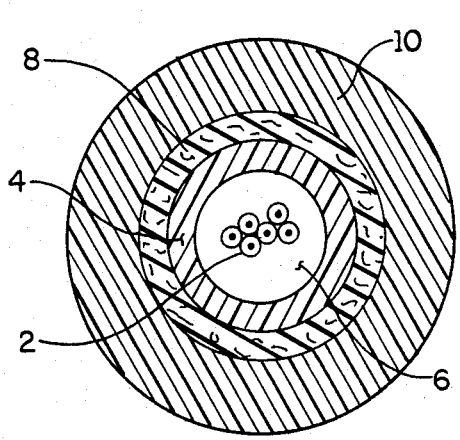
FIG. 1A is a cross-section view of a conventional loose buffer tube communication cable.
Figure 1B:
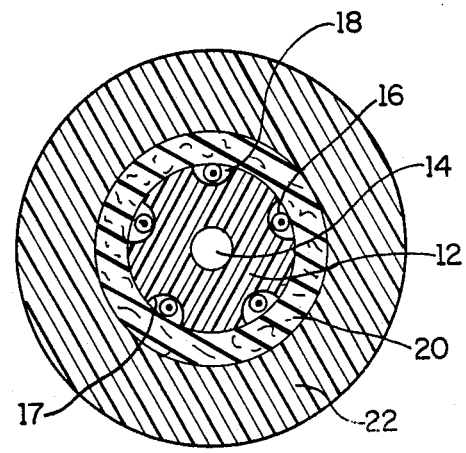
FIG. 1B is a cross-section view of a conventional grooved spacer core communication cable.

With reference now to FIG. 1A, a conventional loose buffer tube cable is illustrated and comprises coated optical fibers 2 loosely fitted in plastic tube 4 which is filled with soft jelly-like material 6. The loose buffer tube cable is surrounded by a layer of KEVLAR 8 or the like which acts as a cushion and provides additional tensile strength. Plastic jacket 10 is applied as an outer casing. FIG. 1B illustrates a prior art design for a grooved spacer core cable construction. The cable comprises plastic grooved spacer core 12 having optional tension member 14 in the center thereof. A plastic coated fiber 16 is positioned in each groove 17 in the surface of grooved spacer core 12 and each groove filled with soft jelly-like material 18. A layer of KEVLAR 20 or the like is provided around grooved spacer core 12 and plastic jacket 22 is used to encase the entire cable construction. Although variations of these particular prior art cables are possible, the two cables illustrated in FIGS. 1A and 1B are representative of conventional loose buffer tube and grooved spacer core cables.

Figure 2A:
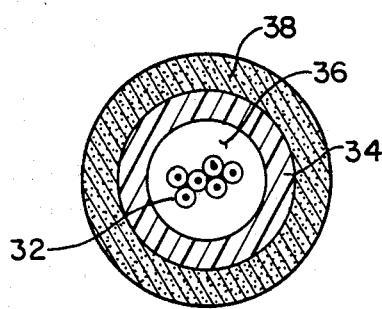
FIGS. 2A-2B are cross-section views of several variations possible in the construction of a ruggedized optical communication cable according to the invention.

FIG. 2A illustrates a loose buffer tube cable constructed according to a first embodiment of the present invention and comprises coated optical fibers 32 positioned in plastic tube 34 which is filled with soft jelly-like material 36. Normally, jelly-like material 36 would have a stable viscosity over a wide temperature range of about −40 degrees C to +70 degrees C and comprise a thixotropic material such a silicone jelly. Tube 34 may be nylon, polyester, polypropylene or any other suitable plastic material, and is about 1.5 to 2.5 millimeters in diameter with a wall thickness of about 0.25 millimeters. In accordance with the invention, the loose buffer tube is provided with a jacket 38 fabricated from a material having a higher Young's Modulus and lower thermal expansion coefficient than the cable. Most suitably, jacket 38 is constructed of fiber reinforced plastic comprising either glass, KEVLAR, carbon, or graphite fibers bound together in an epoxy-type resin. Jacket 38 enhances the thermal stability of the loose buffer tube since the Young's Modulus and thermal expansion coefficient of optical fibers 32 and jacket 38 are similar. The operating temperature range of about −20 degrees C. to +60 degrees C. is increased for this and all subsequently described embodiments of the invention to a representative range of about −40 degrees C. to +70 degrees C. The use of fiber reinforced plastic jacket 38 provides greater impact and compression strength as well as higher permissible installation tension without degrading cable performance. Moreover, fiber reinforced plastic jacket 38 allows for construction of a small diameter cable of about 4 millimeters containing up to 12 or more coated optical fibers. The communication cable is capable of withstanding severe installation conditions and is therefore now suitable for buried and aerial applications in addition to certain duct applications not heretofore possible.

Figure 2B:
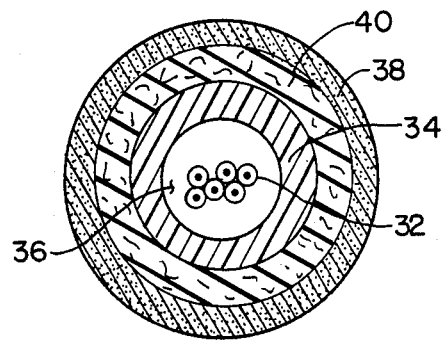

FIG. 2B illustrates a variation of this embodiment of the invention wherein cushioning layer 40 is provided under fiber reinforced plastic jacket 38. Cushioning layer 40 may most suitably be a fibrous material such as KEVLAR or polypropylene yarn or a foam material such as polyethlene. Cushioning layer 40 will improve flexing and bending characteristics of the loose buffer tube cable. For both cable variants illustrated in Figures 2A and 2B, it should be appreciated that a plastic or paper tape (not shown) may be applied over plastic tube 34 and cushioning layer 40 to provide a thermal protective barrier during subsequent manufacturing processing.

Figure 3A:
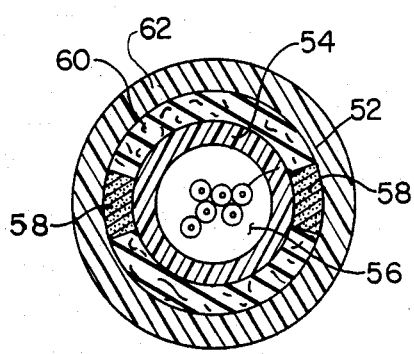
FIGS. 3A-3B are cross-section views of two variants of a second embodiment of the present invention.
Figure 3B:
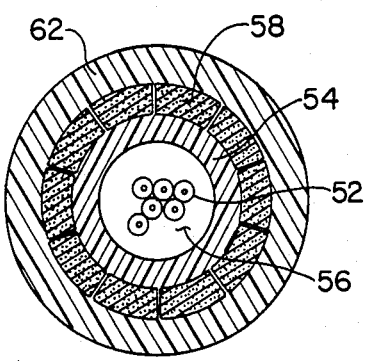

FIGS. 3A and 3B show two variations of a second embodiment of a communication cable manufactured according to the invention. A loose buffer tube at the center of the cable comprises coated optical fibers 52 positioned in plastic tube 54 which may be filled with soft jelly-like material 56 of the type described hereinbefore. The invention contemplates providing one or more rigid tension elements 58 along the outer surface of plastic tube 54 in parallel relationship to plastic tube 54 or stranded therearound with either a fixed or a variable pitch. Rigid tension elements 58, most suitably constructed of fiber reinforced plastic as described in more detail hereinabove, may substantially cover the entire surface of plastic tube 54 (see FIG. 3B) or only a portion thereof as shown in FIG. 3A. If rigid tension elements 58 do not cover the entire circumference of plastic tube 54, a filler or cushion material 60 may be used to fill the area between the spaced-apart tension elements 58. A plastic jacket 62 is applied over rigid tension elements 58. This construction provides a small diameter communication cable for up to about 12 coated optical fibers which has a total cable diameter of about 5 millimeters. Rigid tension elements 58 significantly increase the tensile strength of the loose buffer tube cable and the cable load capability of low elongation levels.

Figure 4A:
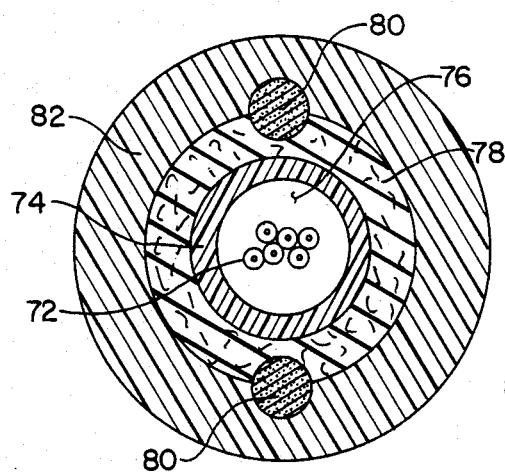
FIGS. 4A-4B are cross-section views of two variants of a third embodiment of the present invention.
Figure 4B:
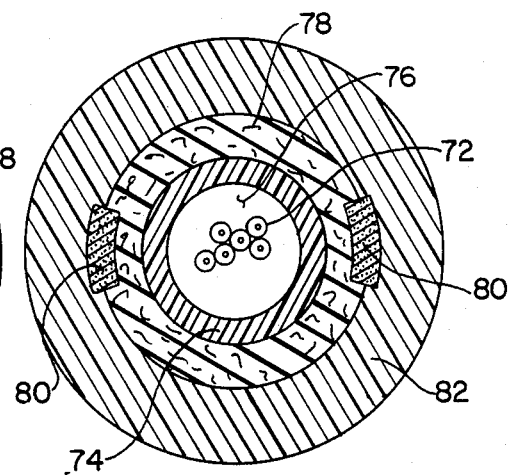

FIGS. 4A and 4B show two variations of a third embodiment of a loose buffer tube communication cable constructed according to the invention. As will be appreciated by now, the loose buffer tube cable comprises a plurality of coated optical fibers 72 positioned within plastic tube 74 which is filled with a soft jelly-like material 76. A cushion layer 78 is applied over plastic tube 74 and may most suitably comprise fibrous material such as KEVLAR, polypropylene yarn and the like in order to improve flexing and bending characteristics and to provide improved impact strength to the communication cable. A plastic or paper tape (not shown) may be applied over cushion layer 78 to provide a thermal protective barrier for subsequent manufacturing processing. One or more rigid tension elements 80, most suitably constructed of fiber reinforced plastic, are provided in contact with cushion layer 78 and radially spaced-apart from plastic tube 74. A plastic jacket 82 is used to encase the entire cable construction. As in previous constructions, plastic jacket 82 may comprise polyethylene, PVC and the like. Whereas FIG. 4A depicts rigid tension elements 80 as having a round diameter, FIG. 4B depicts corresponding rigid tension elements 80 as having a somewhat trapezoidal cross section although other cross section configurations of rigid tension elements may be utilized as a matter of design choice.

A fourth embodiment of a communication cable according to the invention is shown in FIG. 5 and may be better understood with reference thereto. As in previously described constructions, the communication cable comprises a plurality of coated optical fibers 92 positioned within plastic tube 94 which is filled with soft jelly-like material 96. A cushion layer 98 of foamed plastic is applied over plastic tube 94 and most preferably comprises polyethylene or a similar material. Cushion layer 98 has one or more slots 99 in the surface thereof which are each adapted to snugly receive at least a portion of a rigid tension element 100 therein. Slots 99 in cushion layer 98 may be formed so as to be parallel with plastic tube 94 or may extend around plastic tube 94 in a spiral or helical pattern of a predetermined pitch. Although not shown, a heat barrier tape may be applied under cushion layer 98. Rigid tension elements 100 comprise fiber reinforced plastic or any the other high Young's Modulus and low thermal expansion material. Rigid tension elements 100 are restricted in their movement by slots 99 and plastic jacket 102 and thereby tend to maintain their position within the cable during flexing and bending thereof. This particular cable construction provides impact resistance and compression strength along with a wider temperature operating range and enhanced tensile strength.

Finally, FIGS. 6A-6D show cross-sections of a fifth embodiment of communication cables constructed according to the present invention. Unlike the previous embodiments, these figures show an improved grooved spacer core cable construction comprising grooved spacer core 112 which defines a plurality of grooves 114 on the outer surface thereof. A coated optical fiber 116 is provided in each groove 114 and the groove filled with a soft, jelly-like material 118 which possesses a stable viscosity over a wide temperature range. Normally, grooved spacer core 112 possesses approximately 4 to 6 grooves 114 which are helical with either a fixed pitch or a reversible or oscillated pitch. Generally, only one 0.9 millimeter plastic coated fiber 116 will be placed in each groove 114, although several 0.25 or 0.40 millimeter fibers could be placed in a single groove 114. A wrap of polyester or paper tape (not shown) may be used to cover grooved spacer core 112 and grooves 114 therein in order to maintain coated optical fibers 116 and jelly 118 within in the grooves. The improvement to the cable construction is provided by rigid tension elements 120, preferably constructed of fiber reinforced plastic or other suitable high Young's Modulus and low thermal expansion coefficient material, which are stranded around grooved spacer core 112 with an opposite direction pitch to fiber grooves 114. Rigid tension elements 120 may be of any suitable shape as clearly illustrated in the variants illustrated in FIGS. 6A-6D. Also, the area between spaced-apart rigid tension elements 120 may be filled with a water blocking jelly or other type filler (not shown) and a plastic binder or wrap of tape (not shown) may be used to hold tension elements 120 in place. A plastic jacket 122 is applied in order to encase the entire construction. Plastic jacket 122 may be polyethylene, PVC or any similar plastic including high temperature materials.

Rigid tension elements 120 wrapped across fiber grooves 114 provide this cable construction with greater compression and impact strength than conventional grooved spacer core cables. Moreover, rigid tension elements 120 also improve the stress-strain characteristics of the cable and provide wider operating temperature range.

FIGS. 6C and 6D show a cross-section of the improved grooved spacer core cable wherein rigid tension elements 120 contain plastic coated fibers 124. FIG. 6D also provides additional large diameter rigid tension elements 126 in order to absrob impact and compression forces which might otherwise impact rigid tension elements 120 containing coated optical fibers 124. The coated optical fibers 124 provided in rigid tension elements 120 are laid parallel to each other and extend in the direction of tension elements 120. Rigid tension elements 120 thereby serve to provide mechanical and environmental protection to the cable as well as additional plastic coated fibers 124 for transmission. A cable constructed as shown in FIGS. 6C and 6D may be used not only for telecommunication applications but also optical fibers 124 may serve as sensors to protect the cable core by using a detection method such as OTDR for monitoring the installation load, unusual outer forces to the cable and the like.

While the invention has been described in detail and with reference to specific embodiments thereof, it will be apparent to one skilled in the art that various changes and modifications can be made therein without departing from the spirit and scope thereof.

What is claimed is:

1. In an optical fiber communication cable of the loose buffer tube type comprising at least one optical fiber positioned within a plastic protective sheath and a jelly-like material filling the space around said optical fiber, the improvement comprising: a plurality of rigid tension members having a higher Young's Modulus and a lower thermal expansion coefficient than said cable and positioned radially outwardly from said sheath and extending in generally parallel relationship along the length thereof, and an outer casing surrounding said tension members and said sheath therebeneath.

2. In an optical fiber communication cable according to claim 1 wherein a fibrous yarn layer is provided between said protective sheath and said tension members.

3. In an optical fiber communication cable according to claim 1 wherein said tension members comprise fiber reinforced plastic.

4. In an optical communication cable of the loose buffer tube type comprising at least one optical fiber positioned within a protective plastic sheath and a jelly-like material filling the space around said optical fiber, the improvement comprising: a foam-type layer surrounding said sheath and defining a plurality of slots therein extending generally along the length of said sheath, a plurality of corresponding rigid tension members each adapted for being snugly received by a corresponding one of said plurality of slots and each having a higher Young's Modulus and a lower thermal expansion coefficient than said cable, and an outer casing surrounding said foam layer and tension members.

5. In an optical communication cable according to claim 4 wherein said foam-type layer comprises a foamed plastic in which said slots extend generally parallel to said plastic sheath.

6. In an optical communication cable according to claim 4 wherein said foam-type layer comprises a foamed plastic in which said slots extend generally helically around said palstic sheath.

7. In an optical communication cable according to claim 4 wherein said tension members comprise fiber reinforced plastic.

8. In an optical communication cable according to claim 4 wherein said outer casing comprises a plastic outer jacket.

9. In an optical communication cable of the grooved spacer core type comprising at least one optical fiber positioned within each of one or more spiral grooves defined in the outer surface of the protective grooved spacer core, and a jelly-like material filling the spaced around said optical fiber, the improvement comprising: at least one tension member extending generally along the length of said grooved spacer core and being positioned radially outwardly therefrom, said tension member having a higher Young's Modulus and a lower thermal coefficient of expansion than said cable, and an outer casing surrounding said tension member and grooved spacer core.

10. In an optical communication cable according to claim 9 wherein said tension member includes at least one optical fiber positioned therein and extending generally parallel thereto.

11. In an optical communication cable according to claim 9 wherein a plurality of optical fibers are positioned in each of a plurality of tension members.

12. In an optical communication cable according to claim 9 wherein said tension member comprises fiber reinforced plastic.

13. In an optical communication cable according to claim 9 including a tape surrounding said grooved spacer core to better maintain said optical fiber and jelly within said spiral groove.

14. In an optical communication cable according to claim 9 wherein said tension member is helically wound around said grooved spacer core in an opposing direction to the spiral groove defined therein.

15. In an optical communication cable according to claim 9 wherein a plurality of spaced-apart tension members extend along said grooved spacer core and the space therebetween is filled with a jelly-like material.

16. In an optical communication cable according to claim 9 wherein said outer casing comprises a plastic outer jacket.

17. An optical communication cable of the loose buffer tube type comprising:
a plurality of optical fibers extending in a generally parallel relationship to each other along the length of the cable and having a jelly-like substance filling the space around said optical fibers;
a protective member surrounding at least a portion of each of said plurality of optical fibers;
a plurality of fiber reinforced plastic strands positioned radially outwardly from said protective member and surrounding at least a portion of the circumference thereof, said plastic strands extending in parallel relationship along the length of said protective member and being surrounded by an outer casing, said plastic strands furthermore having a higher Young's Modulus and a lower thermal expansion coefficient than the cable, whereby the tensile strength and operating temperature range of the cable are enhanced; and
a foam plastic layer provided between said protective member and said plastic strands, said foam plastic layer defining a plurality of slots therein extending generally along the length of said protective member and each of said slots being adapted for snugly receiving a corresponding one of said plurality of plastic strands.

18. An optical communication cable of the loose buffer tube type comprising:
a plurality of optical fibers extending in a generally parallel relationship to each other along the length of the cable and having a jelly-like substance filling the space around said optical fibers;
a protective member surrounding at least a portion of each of said plurality of optical fibers;
a plurality of fiber reinforced plastic strands positioned radially outwardly from said protective member and surrounding at least a portion of the circumference thereof, said plastic strands extending in parallel relationship along the length of said protective member and being surrounded by an outer casing, said plastic strands furthermore having a higher Young's Modulus and a lower thermal expansion coefficient than the cable, whereby the tensile strength and operating temperature range of the cable are enhanced; and
a foam plastic layer provided between said protective member and said plastic strands, said foam plastic layer defining a plurality of slots therein extending generally along the length of and parallel to the longitudinal axis of said protective member and each of said slots being adapted for snugly receiving a corresponding one of said plurality of plastic strands.

19. An optical communication cable of the loose buffer tube type comprising:
a plurality of optical fibers extending in a generally parallel relationship to each other along the length of the cable and having a jelly-like substance filling the space around said optical fibers;
a protective member surrounding at least a portion of each of said plurality of optical fibers;
a plurality of fiber reinforced plastic strands positioned radially outwardly from said protective member and surrounding at least a portion of the circumference thereof, said plastic strands extending in parallel relationship along the length of said protective member and being surrounded by an outer casing, said plastic strands furthermore having a higher Young's Modulus and a lower thermal expansion coefficient than the cable, whereby the tensile strength and operating temperature range of the cable are enhanced; and
a foam plastic layer provided between said protective member and said plastic strands, said foam plastic layer defining a plurality of slots therein extending generally along the length of and helically around the longitudinal axis of said protective member and each of said slots being adapted for snugly receiving a corresponding one of said plurality of plastic strands.

20. An optical communication cable of the loose buffer tube type comprising:
a plurality of optical fibers extending in a generally parallel relationship to each other along the length of the cable and having a jelly-like substance filling the space around said optical fibers;
a protective member surrounding at least a portion of said plurality of optical fibers so as to loosely contain said fibers;
at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, and said tension member comprising a layer of fiber reinforced plastic surrounding said protective member; and a fibrous yarn layer provided between said protective member and said fiber reinforced plastic layer, whereby the tensile strength and said operating temperature range of the cable are enhanced.

21. An optical communication cable of the loose buffer tube type comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers; and at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending in parallel relationship along the length of said protective member, said strands being surrounded by an outer casing, whereby the tensile strength and operating temperature range of the cable are enhanced.

22. An optical communication cable of the loose buffer tube type comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers;

at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending in parallel relationship along the length of said protective member, said strands being surrounded by an outer casing; and a fibous yarn layer provided between said protective member and said plurality of fiber reinforced plastic strands, whereby the tensile strength and operating temperature range of the cable are enhanced.

23. An optical communication cable of the loose buffer tube type comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers;

at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending in parallel relationship along the length of said protective member, said strands being surrounded by an outer casing; and a foam plastic layer provided between said protective member and said plurality of fiber reinforced plastic strands, said foam plastic layer defining a plurality of slots therein extending generally along the length of said protective member and each of said plurality of slots being adapted for snugly receiving a corresponding one of said plurality of fiber reinforced plastic strands, whereby the tensile strength and operating temperature range of the cable are enhanced.

24. An optical communication cable of the loose buffer tube type comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers;

at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending in parallel relationship along the length of said protective member, said strands being surrounded by an outer casing; and a foam plastic layer provided between said protective member and said plurality of fiber reinforced plastic strands, said foam plastic layer defining a plurality of slots therein extending generally along the length and generally parallel with the longitudinal axis of said protective member, and each of said plurality of slots being adapted for snugly receiving a corresponding one of said plurality of fiber reinforced plastic strands, whereby the tensile strength and operating temperature range of the cable are enhanced.

25. An optical communication cable of the loose buffer tube type comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers;

at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending in parallel relationship along the length of said protective member, said strands being surrounded by an outer casing; and a foam plastic layer provided between said protective member and said plurality of fiber reinforced plastic strands, said foam plastic layer defining a plurality of slots therein extending generally along the length and generally helically around the longitudinal axis of said protective member, and each of said plurality of slots being adapted for snugly receiving a corresponding one of said plurality of fiber reinforced plastic strands, whereby the tensile strength and operating temperature range of the cable are enhanced.

26. An optical communication cable of the grooved spacer core type defining a plurality of helical grooves in the surface thereof comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers; and at least one rigid tension member positioned radially outwardly from said protective member and surrounding at least a portion of the circumference thereof, said rigid tension member extending along the length of said protective member and having a higher Young's Modulus and a lower thermal expansion coeffcient than the cable, said tension member comprising a plurality of fiber reinforced plastic strands extending in parallel relationship along the length of the grooved spacer core and in contact therewith, said strands and said grooved spacer core therebeneath being surrounded by an outer casing, whereby the tensile strength and operating temperature range of the cable are enhanced.

27. An optical communication cable of the grooved spacer core type defining a plurality of helical grooves in the surface thereof comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers; and at least one rigid tension member opitioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending along the length of the grooved spacer core and in contact therewith, said strands being helically positioned around the grooved spacer core in an opposing direction to the helical grooves defined by said grooved spacer core, said strands and said grooved spacer core therebeneath being surrounded by an outer casing, whereby the tensile strength and operating temperature range of the cable are enhanced.

28. An optical communication cable of the grooved spaced core type defining a plurality of helical grooves in the surface thereof comprising:

a plurality of optical fibers extending in a generally parallel relationship to each other along the length of the cable and having a jelly-like substance filling the space around said optical fibers;

a protective member surrounding at least a portion of said plurality of optical fibers so as to loosely contain said fibers; and at least one rigid tension member positioned radially outwardly from said protective member and surrounding at least a portion of the circumference thereof, said rigid tension member extending along the length of said protective member and having a higher Young's Modulus and a lower thermal expansion coefficient than the cable, said tension member comprising a plurality of fiber reinforced plastic strands extending in parallel relationship along the length of the grooved spacer core and in contact therewith, said strands and said grooved spacer core therebeneath being surrounded by an outer casing, and at least one of said strands including at least one optical fiber positioned therein and extending generally parallel to said strand, whereby the tensile strength and operating temperature range of the cable are enhanced.

29. In an optical fiber communication cable of the loose buffer tube type comprising at least one optical fiber loosely positioned within a plastic protective sheath and a jelly-like material filling the space around said optical fiber, the improvement comprising:

a layer of rigid tension material surrounding said sheath and characterized by a higher Young's Modulus and a lower thermal expansion coefficient than said cable; and a fibrous yarn layer provided between said plastic sheath and said layer of rigid tension material.

* * * * *